INVENTOR.
FRANK R. BRADLEY
BY [signature]
ATTORNEYS

NORMALIZATION CIRCUITS FOR POTENTIOMETER DEVICES
USING CONSTANT SOURCE IMPEDANCE VOLTAGE DIVIDERS
Filed May 2, 1966 5 Sheets-Sheet 2

INVENTOR.
FRANK R. BRADLEY
BY Darby & Darby
ATTORNEYS

July 7, 1970 F. R. BRADLEY 3,519,930

NORMALIZATION CIRCUITS FOR POTENTIOMETER DEVICES USING CONSTANT SOURCE IMPEDANCE VOLTAGE DIVIDERS

Filed May 2, 1966 5 Sheets-Sheet 3

INVENTOR.
FRANK R. BRADLEY

BY

ATTORNEYS

INVENTOR.
FRANK R. BRADLEY
BY
ATTORNEYS

INVENTOR.
FRANK R. BRADLEY
BY
ATTORNEYS

United States Patent Office 3,519,930

Patented July 7, 1970

3,519,930

NORMALIZATION CIRCUITS FOR POTENTIOMETER DEVICES USING CONSTANT SOURCE IMPEDANCE VOLTAGE DIVIDERS

Frank R. Bradley, 9 Dash Place,
Bronx, N.Y. 10463

Filed May 2, 1966, Ser. No. 546,822
Int. Cl. G01r *17/02*
U.S. Cl. 324—98 16 Claims

ABSTRACT OF THE DISCLOSURE

A potentiometer device using a constant source impedance voltage divider in which the output voltage of the divider is to be normalized to a reference voltage. Circuits are provided in addition to the normal switching circuits of the divider which further control and set the output voltage of the divider to the normalization voltage.

This invention relates to electrical measuring devices and more particularly to potentiometer circuits using conductance dividers.

Potentiometer devices are well-known in the art for measuring unknown voltages with reference to a source of known voltage, such as a standard cell, and the use of precisely calibrated voltage dividers which balance two voltages in a null detector. While such potentiometer devices are generally considered to have a high degree of accuracy, they have several inherent disadvantages in their construction and operation. Included in these disadvantages are the errors introduced by the usual use of two voltage dividers, one for normalizing the potentiometer to the standard cell voltage and the other for interpolating the normalized voltage for comparison against the unknown voltage, and the fact that the output impedance of the dividers vary over their operating range. The latter prevents optimum impedance matching of null detectors.

The present invention is directed to potentiometer devices which use so-called constant source impedance dividers, often called conductance dividers, instead of the usual voltage dividers. These dividers have a substantially constant output source impedance over their operating range, thereby permitting optimum use of impedance matched null detectors. Also, potentiometer devices can be constructed using only one constant source impedance divider and with improved techniques for simply and rapidly effecting normalization. This produces an important improvement in accuracy since the "normalization" and interpolation are done with the same divider.

It is therefore an object of the present invention to provide potentiometer devices using so-called constant source impedance dividers.

Another object is to provide potentiometer devices using constant source impedance dividers having improved techniques for effecting normalization.

A further object is to provide potentiometer devices using conductance dividers which present a substantially constant source impedance to a null detector.

Other objects and advantages of the present invention will become more apparent upon reference to the following specification and annexed drawings in which.

Figure 10:
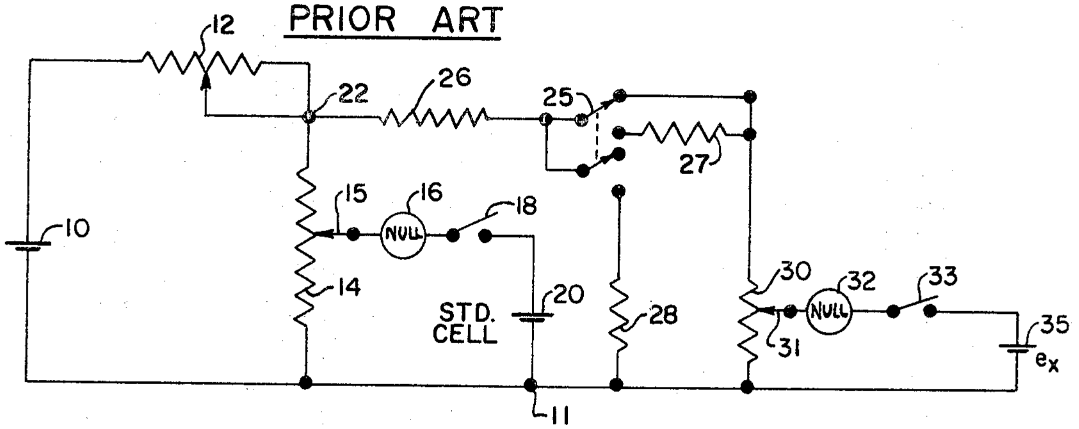
FIG. 10 PRIOR ART
FIG. 10 is a schematic diagram of a prior art potentiometer device.

FIG. 10 shows a conventional prior art potentiometer device for measuring unknown voltages. The potentiometer includes a relatively high capacity, short term, stable source of direct current voltage 10. The voltage from source 10 is applied through a voltage dropping rheostat 12 to a voltage divider 14 whose movable tap 15 supplies one input to a null detector 16, which can be, for example, a galvanometer type device. The other side of null detector 16 receives a voltage through a switch 18 from a stable and precisely known value source of direct current voltage, such as a conventional standard cell 20.

The object of the components so far described is to produce a voltage of precisely known value at a junction point 22 using a known portion of divider 14 as established by the exact value of the standard cell voltage. This process is called "normalizing" the potentiometer and it is accomplished by placing the divider slider 15 at a predetermined point, closing switch 18, and adjusting rheostat 12 until a null is produced in the detector.

The voltage of known value at junction 22 is applied across a range switch 25, illustratively shown as having two single-pole, double-throw sections, whose movable contact arms are mechanically ganged together. The movable arm of the upper switch section is associated with a resistor 27, while the arm of the lower switch section is associated with a resistor 28 connected between the lower contact of its switch section and the common point 11 of the potentiometer. A resistor 26 is located between the junction 22 and the movable contact arms of which 25. Resistor 28 maintains the current in resistor 26 the same independent of the position of switch 25.

An interpolating voltage divider 30 has its upper end connected to resistor 27 and the upper contact of the first section of switch 25. The lower end of divider 30 is connected to point 11 and its slider arm 31 supplies one input to a null detector 32. The other input of detector 32 is an unknown source of voltage 35 ($e_x$) to be measured and it is connected through a switch 33. Normally, only one null detector is utilized and a suitable switching arrangement is provided for interconnecting it in both places shown in the circuit of FIG. 10. For convenience of explanation, two detectors are shown.

To consider an example of a typical operation of a potentiometer of the type shown in FIG. 10, assume that a voltage of 1.2 volts is produced at junction point 22 and that resistor 26 is 20% of voltage divider 30. With 1.2 volts at junction 22, 1 volt appears across divider 30 with range switch 25 in the "up" position. An unknown voltage $e_x$ of between 0 and 1 volt is measured by connecting galvanometer 32 through switch 33 and adjusting divider 30 for a null. At this null setting the fraction of full scale divider 30 setting is proportional to the voltage $e_x$. If the divider 30 is linearly calibrated to span the range 0 to 1 volt, it produces a direct reading in volts.

If resistor 27 is, for example, nine times the value of divider 30, then with the range switch 25 in the "down" position the voltage across the interpolating divider 30 is 0.1 volt and $e_x$ can be precisely measured from 0 to 0.1 volt. Resistor 28 maintains the input impedance presented to the DC source 10 and the dropping rheostat 12 at the same value as with the range switch in the "up" position. Higher voltages than those considered may be measured by using conventional "volt box" techniques.

Potentiometers of the type shown in FIG. 10, have several inherent disadvantages. As can be seen, the scaling of the source voltage 10 is by divider 14 for potentiometer normalization while the voltage scaling for the null detector 32 connected to the unknown source is accomplished by divider 30. This is done because the input impedance presented by the DC source 10 and the voltage dropping rheostat 12 is constant over the range of operation of both of the dividers 14 and 30. While this works, it presents some disadvantages. First of all, since the source impedance from the DC voltage supply 10 is relatively low and the source impedance of dividers 14 or 30 is variable, impedance matching of null detectors for optimum sensitivity cannot be realized. Also, since two dividers 14 and 30 are utilized for normalization and voltage scaling the errors introduced by both dividers are present in the final result. These disadvantages are overcome and other advantageous operating results are produced by the potentiometers of the present invention which use conductance type voltage dividers with a constant, known value of source (output) impedance.

There exists in the art a class of voltage dividers which are known as conductance dividers, or constant source impedance dividers. These dividers present a variable input impedance to the exciting supply and a constant source of impedance at their output. As is described in detail below, the use of conductance dividers in potentiometer devices gives rise to many significant advantages.

Figure 1:
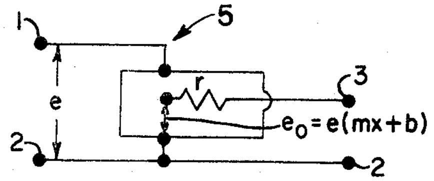
FIG. 1 is a generalized schematic representation of a conductance divider.

FIG. 1 illustrates in general form the type of conductance voltage divider 5 to be used with the present invention. The divider is a three (four) terminal network and has a pair of input terminals 1 and 2, the latter terminal 2 being common and serving as one of a pair of output terminals 2 and 3. Divider 5 is constructed with one or more fixed or variable impedances therein which can be adjusted and/or interconnected by any suitable means (not shown in FIG. 1) in a manner such that when the impedances of the divider are set to produce any particular voltage division ratio $x$ between the input and output terminals, where $x$ is for example any number between zero and one, and a voltage $e$ is applied to input terminals 1 and 2, the output voltage $e_0$ across output terminals 2 and 3 varies as a linear function of $e$ given by (1) $$e_0=e(mx+b)$$

Here, $m$ is the slope of the straight line function and $b$ is the zero intercept on the abscissa of a cartesian coordinate ($x$–$y$) graph. Both $m$ and $x$ are determined by the components and connection of the divider.

The divider is also constructed so that the voltage $e_0$ of Equation 1 has a fixed source impedance $r$ looking into terminals 2 and 3 for any ratio setting $x$ of the divider. The source impedance $r$ of the divider is also determined by its design. Another way of describing the characteristics of the divider 5 is that when input terminals 1 and 2 are shorted, the impedance measured between output terminals 2 and 3 or terminals 1 and 3 is constant, and equal to $r$, independent of the ratio setting $x$. Many types of suitable dividers having these characteristics are currently in use including those commonly called conductance dividers.

Figure 2:
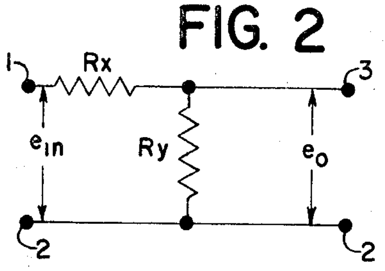
FIG. 2 is a schematic diagram explaining the operation of the conductance divider.

Before considering the operation of a potentiometer constructed in accordance with the present invention, reference is made to FIG. 2 which illustrates the general principles of one type of constant source impedance divider useful with the present invention. While pure resistive elements are shown, a similar analysis to that presented below can be made for complex impedance elements. Here the input voltage $e_{in}$ is applied across the input terminals 1 and 2 of a network formed by two resistors $R_x$ and $R_y$ connected in series across the source. The output voltage $e_0$ is taken from terminals 2 and 3 across resistor $R_y$. Resistor $R_x$ is formed by any number of parallel connected resistors connected in series between terminals 1 and 3 of the divider. Resistor $R_y$ is formed by any number of parallel connected resistors connected across terminals 2 and 3. Resistors $R_x$ and $R_y$ each represent any given number of resistors connected in parallel in each of the $R_x$ and $R_y$ branches from zero to the maximum number of resistors available in the divider network.

The output voltage $e_0$ is given in FIG. 2 by:

(2) $$e_0=\frac{e_{in}Ry}{R_x+R_y}=\frac{e_{in}R_yR_x}{R_x+R_y}\cdot\frac{1}{R_x}$$

The factor $$\frac{R_yR_x}{R_x+R_y}$$

in (2) is the value of $R_x$ and $R_y$ in parallel which is the value of all of the resistances of the network in parallel. This would be produced when input terminals 1 and 2 were shorted together. Since this is a constant, the factor is designated as $R_0$.

The factor $1/R_x$ in (3) can also be represented as:

(3) $$\frac{1}{R_x}=\left[\frac{1}{AR}+\frac{1}{BR}+\ldots+\frac{1}{DR}+\ldots\frac{1}{NR}\right]$$

where R is a resistance value and A, B . . . D . . . N are integers. Equation 3 gives the reciprocals of the resistances placed into the $R_x$ arm of the network. Equation 2 now becomes in terms of $e_0$.

(4)

$$e_0=e_{in}R_0\cdot\frac{1}{R_x}=e_{in}\left[\frac{R_0}{R}\left(\frac{1}{A}+\frac{1}{B}+\ldots\frac{1}{D}+\ldots\frac{1}{N}\right)\right]$$

Since for any given network of FIG. 2, $R_0$ is known and R is a constant, values of A, B, C, D . . . N can be selected to produce a straight line output voltage function $e_0$ in response to an input voltage $e_{in}$.

Figures 3, 4A, 4B, 5A:
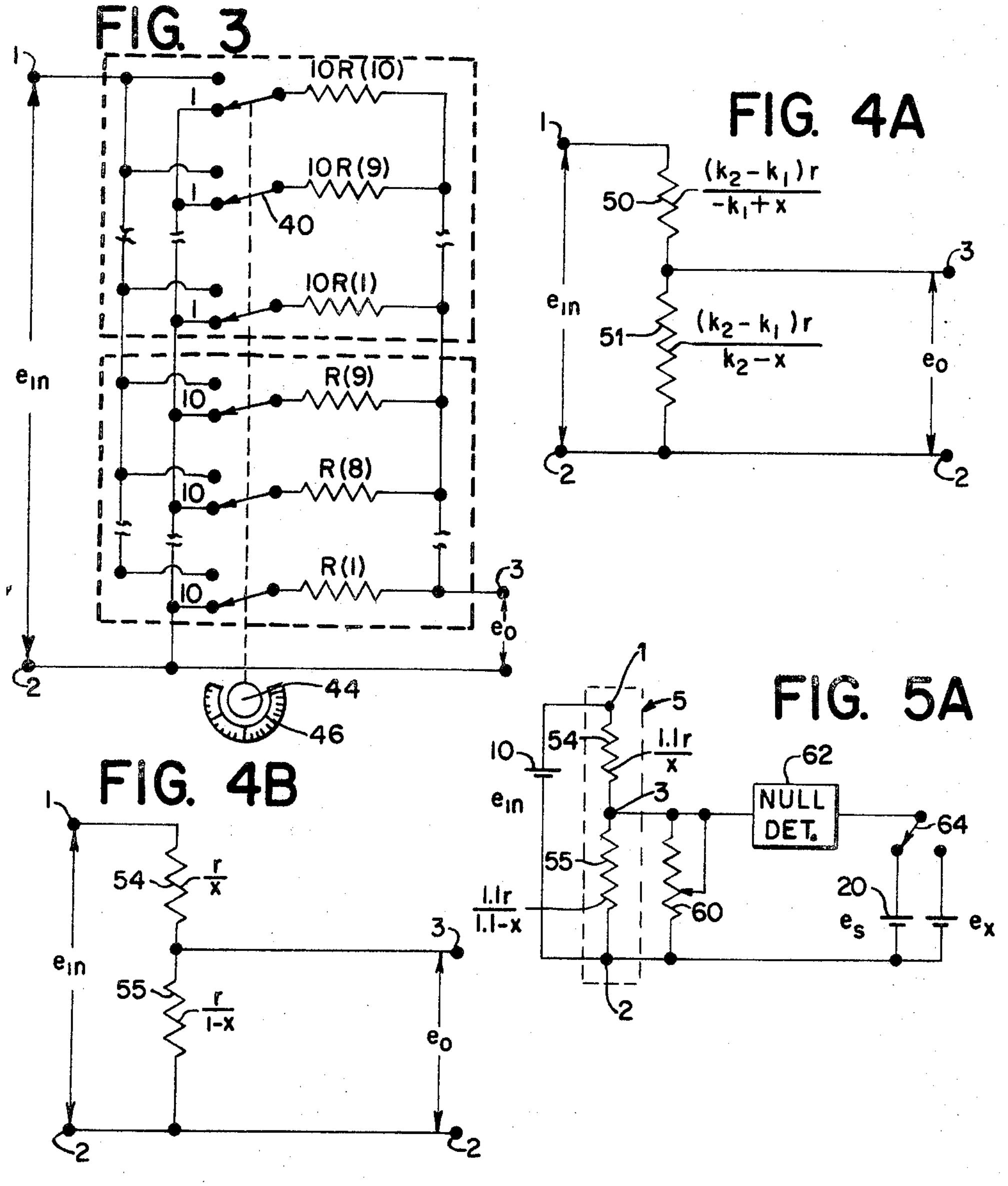
FIG. 3 is a schematic diagram of a decimally weighed conductance divider.
FIGS. 4A and 4B are schematic diagrams illustrating other ways of generally representing the conductance divider.
FIGS. 5A and 5B are generalized schematic diagrams of potentiometers constructed using conductance dividers.

FIG. 3 shows one type of constant source impedance divider according to FIG. 2, utilizing decimal weighting. The divider input terminals 1 and 2 are connected across a source of input voltage $e_{in}$ (not shown). A single-pole, double-throw switch 40 is provided for each resistor in the divider and the upper contact of each switch is connected to divider input terminal 1 while the lower contact is connected to input terminal 2. The arm of each switch has a resistor connected thereto and one end of each of these resistors is connected to common summing point terminal 3.

The divider of FIG. 3 is to produce one hundred steps of one unit each. To do this, two decades are used. The first decade includes nine divider resistors of value R, designated R(1) through R(9), one end of each of which is connected to the movable contact arm of a respective switch 40. The second decade has ten resistors of value 10R, designated 10R(1) through 10R(10), one of each of which is also connected to a respective switch 40. The ratio of $e_0$ to $e_{in}$ of the divider of FIG. 3 is:

(5) $$\frac{e_0}{e_{in}}=\frac{n}{100}$$

where $0\leq n\leq 100$ and $n$ is the number of switch "weightings" for those switches 40 returned to the high side (up-position) terminal 1 of the divider. The "weighting" is shown adjacent each switch 40. It should be clear that each resistor of value R contributes a weighting of 10 parts of the 100 available while each resistor of value 10R contributes 1 part. By selectively operating switches 40 the value of $e_0$ can be selected in steps of 1/100 $e_{in}$. For example, where $e_0$ is to be 87/100 $e_{in}$, $x=87$, resistors R(1) through R(8) and 10R(1) through 10R(7) each has its respective switch 40 connected to the high side terminal 1. It can be shown that $$r=\frac{R}{10}$$

in the divider of FIG. 3. A control 44 is shown for operating the switches 40. Control 40 can be, for example, a rotary switch which operates the individual switches 40 to put any number in the "up" or "down" position. Control 44 operates in conjunction with a scale dial 46 which is linearly calibrated due to the linear operation of divider 5. It is preferred that a separate control and scale be used for each decade of the divider although one control and scale can be used. In all further divider configurations discussed below, the controls 44 and linear scales 46 are assumed, although not shown. Also, it should be mentioned that all of the switches referred to hereafter for connecting the divider impedances to either terminals 1 or 2 are preferably of the break-before-make type to prevent shorting out the source voltage 10. Such switches are conventional in the art.

It should be understood that although the voltage division ratio $x$ must be between zero and one, that the scale dial 46 can be calibrated in other terms. For example, the scale can be calibrated from zero to 1.1 to correspond to the division ratio $x$ of zero to one.

The number of output voltage steps available from the divider of FIG. 3 can be increased by adding other decades of proportionately higher value resistors, or by adding other decades of the same or lower value resistors and introducing scaling resistors in the line to the assuming point 3. An example of the former technique is given below. The latter technique is also conventional in the art.

FIGS. 4A and 4B show alternative generalized ways of representing the dividers of FIGS. 1–3. In FIG. 4A, equivalent resistor 50 corresponds to resistor $R_x$ in FIG. 2 while equivalent resistor 51 corresponds to resistor $R_y$. The values for equivalent resistors 50 and 51 are shown on the drawing. The specific values of $k_1$ and $k_2$, the scale calibration, depend upon the divider and are equal to or greater than zero; $r$ is the constant value source impedance; and $x$ is the division ratio of the divider and is selected so that $k_1 \leq X \leq k_2$.

In FIG. 4B the value of $r/x$ of the equivalent resistor 54 corresponds to resistor $R_x$ of FIG. 2 while the value $$\frac{r}{1-x}$$

of equivalent resistor 55 corresponds to resistor $R_y$. Here again, $x$ is the division ratio of the divider while $r$ is the constant value source impedance. The scale is calibrated from zero to one. It can be seen that resistor 54 indicates the fractional portion of the divider switch weightings which are "up" while resistor 55 indicates the fractional portion of the divider switch weghtings which are "down."

Figures 5B, 6, 7:
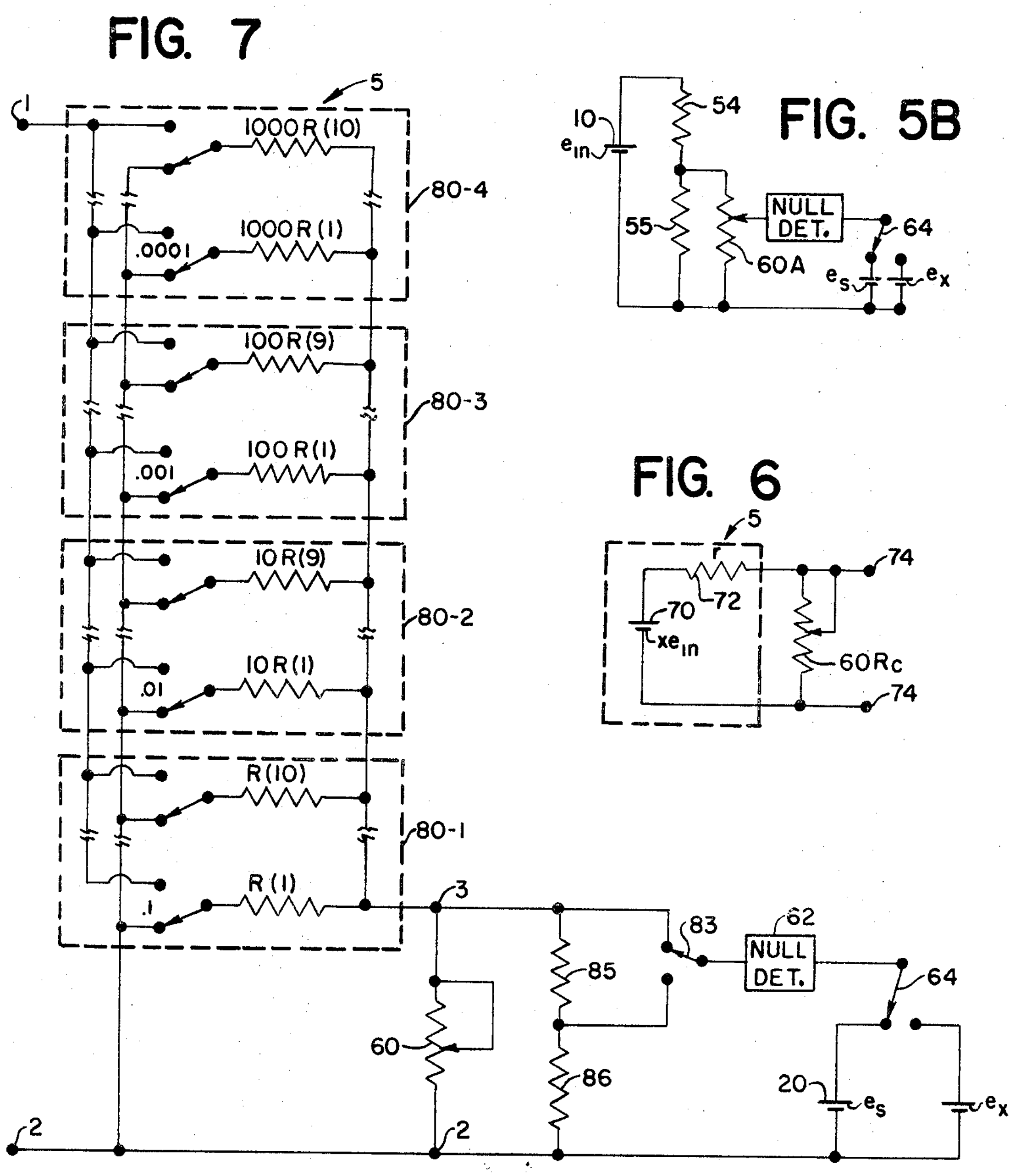
FIG. 6 is a schematic of a generalized circuit explaining certain of the details of operation of the potentiometer of FIG. 5A.
FIG. 7 is a schematic of one embodiment of a potentiometer using a conductance divider.

FIGS. 5A and 5B illustrate the general principles of the potentiometer device of the present invention. In FIG. 5A the input voltage source 10 supplies conductance divider 5 with a voltage $e_{in}$. The voltage $e_{in}$ has negligible source impedance compared to the input impedance of divider 5 or it is regulated. Hence it is substantially unaffected by variation in the input impedance of the divider. Divider 5 is set to produce a desired division ratio. Where the potentiometer is to be normalized to the voltage of standard cell 20, the full scale voltage across terminals 2 and 3 is, for example, selected to be 1.1 volts, and the divider scale runs between 0 and 1.1. Hence, the value for equivalent resistors 54 and 55 are given as $$\frac{1.1r}{x} \text{ and } \frac{1.1r}{1.1-x}$$

A variable calibrating resistor (rheostat) 60 of value $R_c$ is connected across output terminals 2 and 3 of the divider 5. A null detector 62 receives one input from the summing arm 3 of the divider 5 and another input from a switch 64 which can be connected between the standard cell 20 voltage source $e_s$ or the unknown voltage $e_x$.

To understand the operation of the potentiometer of FIG. 5A, reference is made to FIG. 6 which is the equivalent circuit of the potentiometer. The divider 5 is represented as a battery 70 of voltage $xe_{in}$, where $x$ is the divider ratio, driving the calibrating resistor 60 through a resistor 72 which is the internal source impedance of value $r$ of the divider. Here, the voltage across terminals 74, which is the input to the null detector of FIG. 5A, is given as:

$$e_{out}=\frac{R_c}{R_c+r}xe_{in} \quad (6)$$

Thus, the load resistor 60($R_c$) introduces a scale factor, to change the voltage applied to the null detector.

In the potentiometer of FIG. 5A resistor 60 is adjusted to produce a null in the detector when the standard cell 20 is connected in the circuit after the divider 5 has been set to the value of standard cell voltage. This normalizes the potentiometer referenced to the standard cell so that when the unknown voltage $e_x$ is switched to the null detector the scale of the divider 5 accurately reads out the unknown voltage referenced to the standard cell voltage when the detector 62 is nulled. It should be noted that there is no load on the voltage $e_x$ being measured when the null condition is produced.

FIG. 5B shows another form of potentiometer device, which is similar to that of FIG. 5A. Here, normalization is achieved by dividing down the output of divider 5 across an adjustable voltage divider 60A, shown in the form of an adjustable resistor 60A whose slider applies a voltage to one input of the null detector.

FIG. 7 shows a typical potentiometer constructed with a conductance divider of the present invention. Here, a decimally weighted divider 5 has four ratio decades 80–1, 80–2, 80–3 and 80–4. Decade 80–7 has ten resistors R(1) through R(10) of value R and their respective switches for connecting each resistor to the high or low side of the divider. Decade 80–2 contains nine resistors of values 10R(1) through 10R(9) and their switches, while decade 80–3 has nine resistors of value 100R(1) through 100R(9) and their switches and decade 80–4 has 10 resistors of value 1000R(1) through 1000R(10) and their switches. It should be clear that the ten resistors of decade 80–1 correspond to ten steps of the lowest voltage division ratio .1, decade 80–2 to nine steps of ratio 0.1, decade 80–3 to nine steps of ratio .001 and decade 80–4 to ten steps of ratio .0001. Since decades 80–1 and 80–4 each contain ten resistors the output of the divider can be 1.1 so that the respective fractions $$\frac{1.1r}{x} \text{ and } \frac{1.1r}{1.1-x}$$

can be obtained. Divider 5 of FIG. 7 can produce eleven thousand steps of .0001 each in the voltage division ratio. Here, $$r=\frac{R}{11}$$

The normalizing rheostat 60 is connected across the output terminals 2 and 3 of the divider as in FIG. 5A, so that the potentiometer can be normalized when switch 64 is connected to the standard cell source 20 of voltage $e_s$. Normalization is accomplished with a range switch 83 in the up position tapping off the complete divider voltage output across a fixed divider formed by two resistors 85 and 86 for application to detector 62. To normalize the potentiometer, the designated value of standard cell voltage is produced at the summing junction 3 by putting appropriate switches to the high side terminal 1 of the divider and placing all of the other switches "down." Rheostat 60 is then adjusted to produce a null in detector 62 with the switch 64 connected to standard cell 20. Once normalization is achieved, switch 64 is used to connect $e_x$ to the null detector. The switches of divider 5 are then set to produce a null condition. This measures the voltage $e_x$ in terms of the standard cell normalized voltage division of divider 5.

Switch 83 and resistors 85 and 86 form a range switching circuit to reduce the output voltage from the divider which is applied to the left-hand side of the null detector. If, for example, resistor 85 is nine times larger than resistor 86 then the voltage division ratio is 10:1. Therefore, with switch 83 in the "down" position only 1/10 of the voltage at terminal 3 is applied to the null detector. This scales down the operating range of the potentiometer. It should be understood that any suitable voltage division ratios may be obtained by proper selection of the values of resistors 85 and 86 and multiple range switching also may be utilized.

Figure 8:
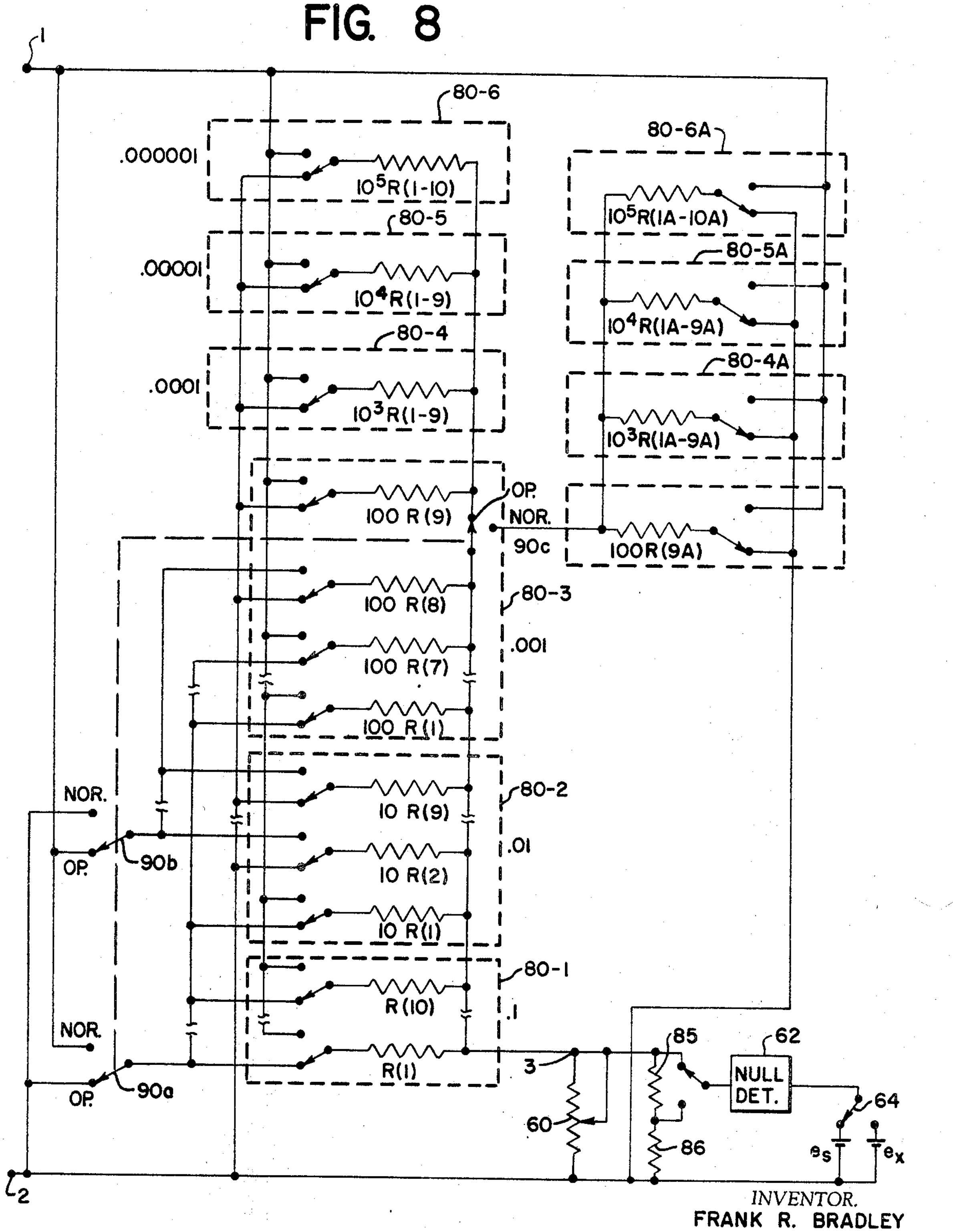
FIGS. 8, 9 and 9A are schematic diagrams showing improved normalization techniques for the potentiometers of the present invention.

FIG. 8 is a potentiometer circuit similar to that of FIG. 7 in which provision is made for rapid normalization. Potentiometer devices are usually normalized every few minutes to compensate for component drift and change in the input voltage so that the accuracy of the potentiometer is not compromised. In most types of prior art potentiometers an auxiliary voltage divider is used which is switched into the potentiometer circuit. This second divider must also be highly accurate, thereby necessitating additional expense. In accordance with the conductance dividers utilized with the present invention, normalization can be accomplished very easily using essentially the same divider as is used in making the measurement of $e_x$.

One normalization technique in accordance with the present invention is shown in FIG. 8. Here, a decimally weighted conductance divider 5 has six decades 80–1, through 80–6. Decade 80–1 has ten resistors of value R and their associated switches while each of the other decades has nine resistors with the exception of decade 80–6 which has ten resistors. The value of each resistor in each successively higher numbered decade increases by a factor of 10. A single-pole, double-throw switch 90 having three sections 90*a*, 90*b* and 90*c* is also provided with their center arms mechanically ganged together. Moving the switch sections 90 to the "up" position puts the potentiometer in the "normalize" mode while with the switches in the "down" position the potentiometer is in the "operate" mode.

With switch 90 in the "operate" mode, the conductance divider functions in the normal manner. The lower contacts of the respective switches of the resistors in decade 80–1 are all returned to divider terminal 2 through switch section 90*a*. The same is true with resistor 10R(1) of decade 80–2 and resistors 100R(1) through 100R(7) of decade 80–3. The upper contacts of the switches for resistors 10R(2) through 10R(9) of decade 80–2 and 100R(8) of decade 80–3 are returned to the high side terminal 1 of the divider through switch section 90*b*. Resistor 100R(9) and the nine resistors each of the subsequent decades 80–4, 80–5, 80–6, the individual resistors not being shown, are in the conductance divider circuit since switch 90*c* is in the position shown. In the operate mode the resistors of each of the six decades 80–1 through 80–6 is switched in a normal manner to produce voltage division ratios in steps of .000001 which is the division ratio of each of the resistor of value $10^5$R in decade 80–6.

When switch 90 is moved to the "normalize" mode, in the up position, all of the ten resistors of decade 80–1 are returned to the high side terminal 1 irrespective of the setting of the respective switches of the decade since those switches set to the down position are returned to terminal 1 through switch section 90*a*. The same holds true for resistor 10R(1) of decade 80–2 and resistors 100R(1) through 100R(7) of decade 80–3. In the normalize mode resistors 10R(2) through 10R(9) of decade 80–2 all are connected to the low side terminal 2 of the divider, since switch section 90*b* connects those switches set to the up position to terminal 2, together with resistor 100R(8) of decade 80–3. Thus, the output at the summing junction 3 is 1.017.

With switch 90*c* thrown to "normalize" (to the right), a number of alternate resistors are connected into the divider. Resistor 100R(9A) takes the place of resistor 100R(9) of decade 80–3. Two additional decades 80–4A and 80–5A each having nine resistors and a decade 80–6A having ten resistors, these being of the same values as the resistors of the corresponding main decades 80–4, 80–5 and 80–6, are now switched into the circuit. It is only necessary to manipulate the respective switches of the alternate resistor 100R(9A) and the resistors of the three alternate decades 80–4A, 80–5A and 80–6A above the base value of 1.017 set in by the resistors of decades 80–1, 80–2 and 80–3 to normalize the potentiometer by varying potentiometer 60 to an accuracy of six decimal places. This is done without affecting the setting of any of the switches of the conductance divider used to measure $e_x$ when switch 90 is turned back to the "operate" mode. In this mode, the operation of the potentiometer is the same as that described with respect to FIG. 7. Note that only the least significant 0.2% of the divider elements are changed between "normalization" and operation.

Figure 9:
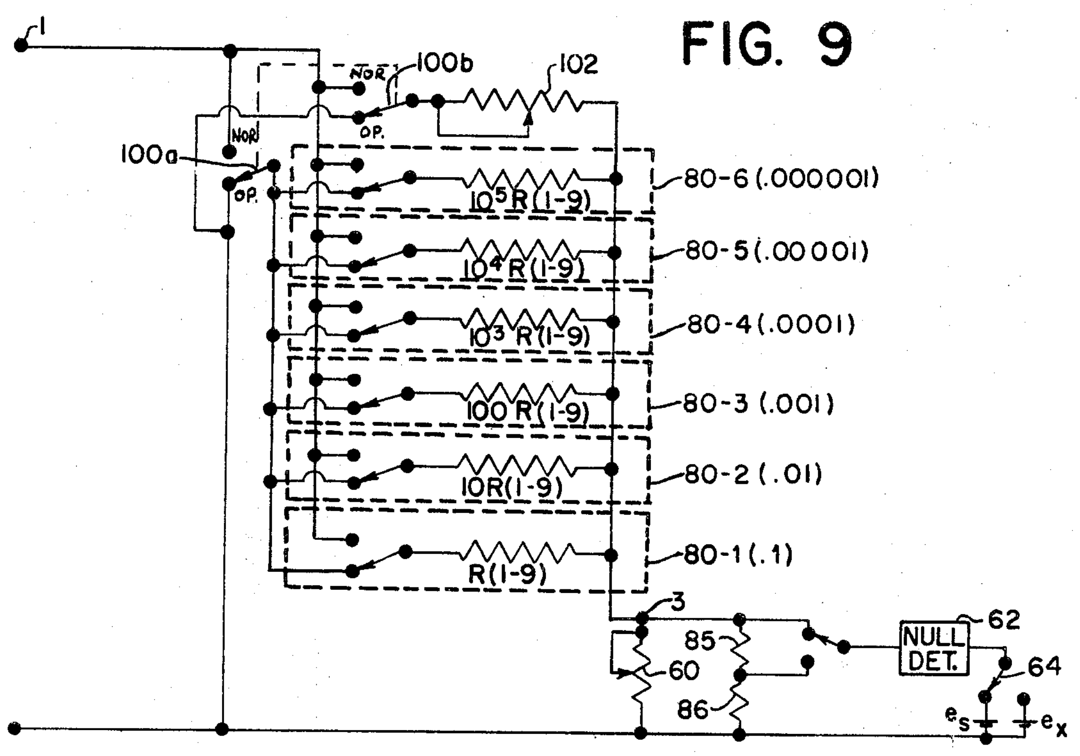

FIG. 9 shows another normalization scheme. Here again six decades 80–1 through 80–6 of a decimally weighted (six decimal places) divider is used, the nine resistors, and their respective switches of each of decades 80–1 through 80–5 and the ten resistors and switches of decade 80–6 each being shown symbolically by one resistor and one switch as in FIG. 8. This divider has a full scale reading of 1.0 in steps of .000001. A single pole double-throw switch 100 with two sections 100*a* and 100*b* is used to switch the conductance divider from the "operate" (down position) to the "normalize" (up position) mode. In the normalize position of switch 100, all of the resistors of all of the six decades have those switches not already connected to terminal 1 returned to the high side terminal 1 of the conductance divider by switch section 100*a*. An adjustment resistor 102 is shunted across the six decades by the switch section 100*b*. The adjustment resistor 102 is preset to provide an offset voltage above one volt equal to the standard cell voltage. It should be apparent that in the "normalize" mode the voltage division ratio of conductance divider 5 is 1.0 and with adjustment resistor 102 shunted across terminals 1 and 3, the voltage at summing point 3 is raised as the value of resistor 102 is lowered. Resistor 102 is preferably a dial controlled resistance decade device, the dials being calibrated in terms of the standard cell voltage.

The calibration resistor 60 is adjusted in the "normalize" positon of switch 100, all elements of the divider returned to the high side terminal 1, so that a null is achieved against standard cell 20 whose voltage value has been preset into adjustment resistor 102. Thus adjustment resistor 102 need only put in an offset of .017 to .019, a standard cell normally being in the range of 1.017 to 1.019 volts, against the full scale contribution of the divider. Here. the normalization adjustment affects only 2% (from .017 to .019) of the overall mode.

With switch 100 in the "operate" position, divider 5 operates in the normal manner. The adjustment resistor is now returned to the low side terminal 2 of the divider by switch 100*b* so that the source impedance of the conductance divider remains the same for both the "operate" and "normalize" modes.

Figure 9A:
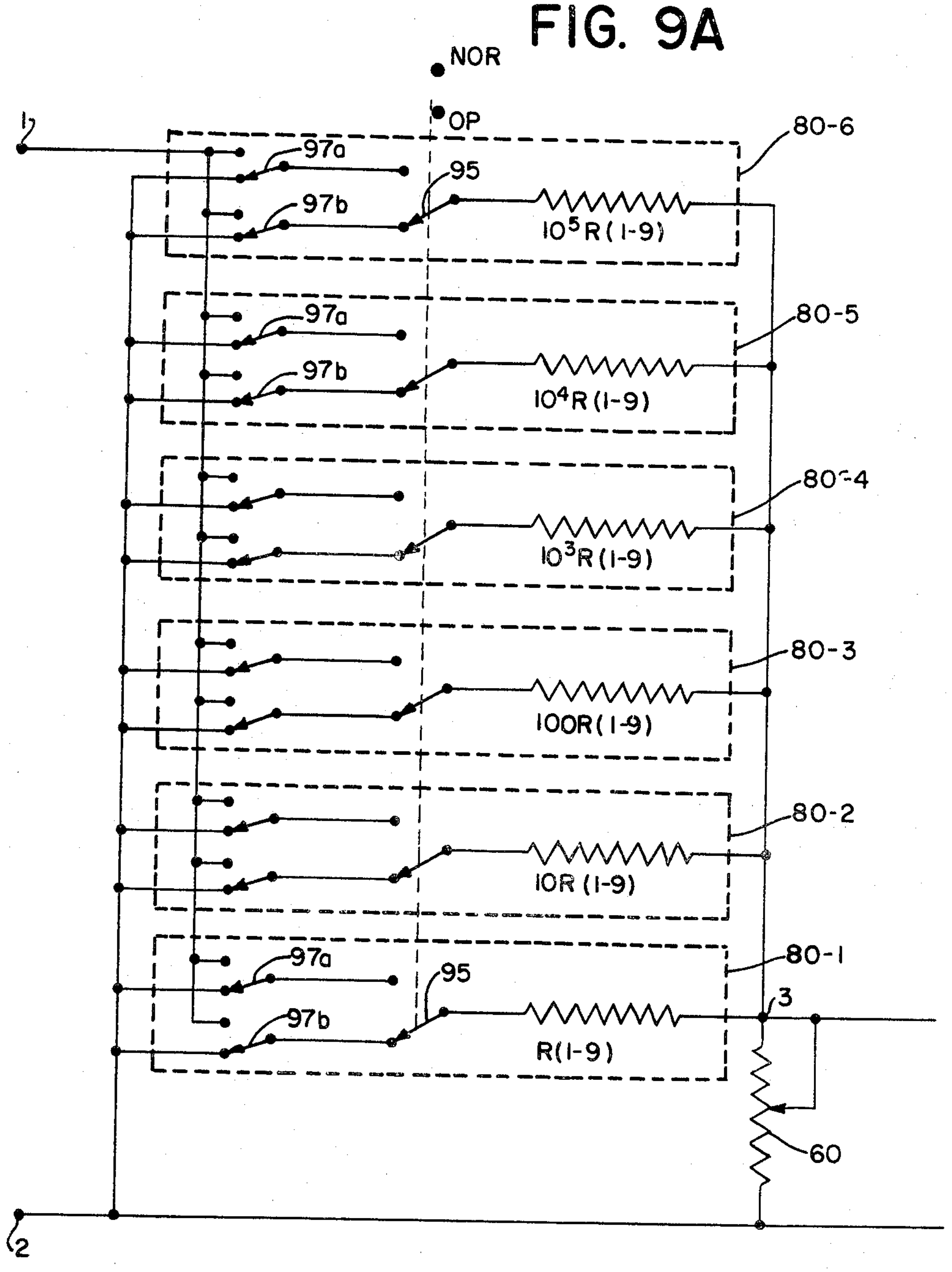

FIG. 9A shows another arrangement for normalizing the potentiometer. Here again, the resistors of ecah decade of a six decade conductance divider are shown schematically by a single resistor for the decades 80–1 through 80–6. The left end of each resistor of each decade has the movable arm of a two pole single throw switch 95 connected thereto. All of the switches 95 are ganged together to be operated at one time. The upper stationary contact of each switch 95 is connected to the movable arm of a two pole single throw *97a* while the lower staionary contact of each switch 95 is connected to the movable arm of a similar switch *97b*. All of the lower stationary contacts of all of the switches *97a* and *97b* are returned to divider terminal 2 while their upper stationary contacts are returned to terminal 1. Each switch *97a* and *97b* operates independently.

The ganged set of switches 95 serve as the normalize-operate switch. As should be evident, operation of switch 95 connects all of the resistors of all decades to either of the movable center arms of either the upper or lower independent switches *97a* or *97b*. As illustrated switches *97a* are the normalize switches, so with switch 95 "up" the decade resistors are set to normalize the divider by adjusting resistor 60 after the divider resistors have been switched to either terminal 1 or 2 of the divider by their respective switches *97a* or *97b*. When switch 95 is "down," the divider resistors are disconnected from switches *97a* and are now operated by the switches *97b* in the usual manner to measure the unknown voltage. The details of the potentiometer beyond the calibrating resistor 60 are not repeated again.

It should be understood that the arrangement of FIG. 9A dualizes the use of the divider 5 through the switches 95, *97a* and *97b* to enable it to be used, effectively, as two separate dividers—one for normalization and one for operational measurements of the unknown voltage. Of course, the dualized switching enables the potentiometer to be used for other purposes such as to alternately measure two unknown voltages without resetting the switches each time. In a typical embodiment, the two sets of switches *97a* and *97b* for the divider decades would be of the rotary type and located on a common control panel. Also, the $e_s$–$e_x$ switch 64 (see FIG. 8) preferably would be ganged to operate with switch 95 so that the appropriate voltage is applied to the divider during the operate and calibrate mode.

Other applications of the divider are feasible such as setting the high and low limit of a test variable with switches *97a* and *97b* (FIG. 9A) respectively and rapidly switching between these limits with switch 95.

It should be understood that while the resistance values of the resistors of each successive higher numbered decade is shown to increase by a factor of 10 in each of the decimally weighted dividers of FIGS. 3, 7–9 and 9A, this need not be the case. Instead, a scaling resistor can be placed in the line to the summing point to divide the current contribution down from the higher dividers. For example, a resistor placed in the summing line to junction 3 between the last resistor in decade 80–3 and the first resistor in decade 80–4 which would divide the current contribution by 10 would also result in a reduction of resistors in decades 80–4 through 80–6 by a factor of 10. Other values of scaling resistors can be used between adjacent decades to produce desired scaling and thereby reduce the ohmic values of the resistors used.

While the potentiometer devices of the present invention have been shown as using decimally coded conductance dividers, it should be understood that any other type of coding scheme may be utilized. For example, the dividers can use binary coded decimal (BCD) coding. Construction of such dividers using BCD coding is conventional.

While the various switches 40 for the dividers of the potentiometer have been shown illustratively as individual single-pole, double throw switches, it should be understood that in practice these switches would more advantageously be operated by dial type switches. For example, each decade of a divider would have one switch which would successively switch the resistors of the decade to terminal 1 or 2 of the divider as the switch was rotated, so that all of the resistors above the switch setting would be connected to terminals 1 and all of the resistors below to terminal 2, or vice versa. Such a switch arrangement is conventional in the art.

While preferred embodiments of the invention have been described above, it will be understood that these are illustrative only, and the invention is limited solely by the appended claims.

What is claimed is:

1. A potentiometer device for accurately measuring a voltage of an unknown value which is adapted for operation from a source of voltage for supplying a selectively variable voltage as one input to a null detector which receives as another input voltage from a standard reference source or from a source of voltage of unknown value comprising:

a variable voltage divider having a plurality of impedance components, output terminals and input terminals for connection to said source of voltage, said voltage divider including first switching means for linearly varying its voltage division ratio by changing the interconnection of the impedance components of said divider between the input and output terminals to produce a correspondingly varying output voltage at said output terminals and a substantially constant output impedance of a known value at said output terminals irrespective of the interconnections of the divider impedance components, auxiliary switching means connected to the impedance components of said divider, said auxiliary switching means when operated in a first position connecting said impedance components in a predetermined manner between said input and output terminals and producing a predetermined voltage division ratio irrespective of the ratio produced by the preexisting interconnections of the divider impedance components determined by said first switching means, and when in a second position permitting said divider to operate under the control of said first switching means, and means connected to the output terminals of said voltage divider in circuit relationship with the constant output impedance of the divider to form another voltage divider to further adjust the output voltage for application to said null detector.

2. A potentiometer device as in claim 1 wherein said means for adjusting the divider output voltage for application to the null detector comprises a variable rheostat electrically connected across the divider output terminals whose total impedance across said output terminals is variable to adjust the output voltage.

3. A potentiometer device as in claim 1 wherein said means for adjusting the divider output voltage comprises a potentiometer electrically connected across the divider output terminals, the variable arm of the potentiometer tapping off the voltage to be applied to the null detector.

4. A potentiometer device according to claim 1 and further comprising range switching means connected to said last-named adjusting means for selecting a predetermined fractional portion of the adjusted divider output voltage for application to said null detector.

5. A potentiometer device according to claim 1 further comprising impedance means electrically connected across the divider output terminals to increase the divider output voltage when said auxiliary switching means is in said first position above that produced by the divider when set to its highest division ratio to produce the highest output voltage under the control of said first switching means.

6. A potentiometer device according to claim 1 further comprising auxiliary divider means connected by said auxiliary switching means to the first named variable voltage divider when said auxiliary switching means is in said first position and operative to further change the predetermined voltage division ratio produced by said auxiliary switching means, said auxiliary divider means being inoperative to affect the voltage division ratio when said auxiliary switching means is in said second position.

7. A potentiometer device as in claim 1 wherein said voltage divider is a three terminal device whose first and second terminals comprise the divider input terminals and whose second and third terminals comprise the divider output terminals, said divider impedance means each having one end connected to said third terminal and said first switching means operates to selectively switch the other end of each of said plurality of impedance means to said first or said second terminals to vary the voltage division ratio, said auxiliary switching means when operated in said first position connecting the said other ends of predetermined ones of said plurality of impedance means to said first or second terminals in a predetermined manner to produce said predetermined voltage division ratio and predetermined output voltage.

8. A potentiometer device as in claim 7 wherein said means for adjusting the divider output voltage for application to the null detector comprises a variable rheostat electrically connected across the second and third terminals of the divider, the impedance of the rheostat across its output terminals being variable to adjust the output voltage.

9. A potentiometer device as in claim 7 wherein said means for adjusting the divider output voltage comprises a potentiometer whose fixed terminals are respectively electrically connected to said second and third divider terminals, the variable arm of the potentiometer tapping off the voltage to be applied to the null detector.

10. A potentiometer device according to claim 7 and further comprising range switching means connected to said last-named adjusting means for selecting a predetermined fractional portion of the adjusted divider output voltage for application to said null detector.

11. A potentiometer device according to claim 7 wherein said auxiliary switching means connects the said other ends of all of said plurality of impedance means to said first terminal and further comprising first impedance means which are connected across said first and third terminals by said auxiliary switching means when in said first position to increase the divider output voltage above that produced by said divider when set to its highest division ratio.

12. A potentiometer device according to claim 11 wherein said first impedance means is a resistor whose resistance value appearing across said first and third terminals can be varied.

13. A potentiometer device according to claim 7 further comprising auxiliary divider means connected by said auxiliary switching means in series with said variable voltage divider when said auxiliary switching means is in said first position to further change the predetermined voltage division ratio produced by said auxiliary switching means, said auxiliary divider means being inoperative to affect the voltage division ratio when said switching means is in said second position.

14. A potentiometer device according to claim 13 wherein said auxiliary divider means comprises a plurality of impedance means each having one end connected to said third terminal of said variable voltage divider and means for selectively switching the other end of each of said impedance means to said first or second terminal of said variable voltage divider when said auxiliary switching means is in said first position.

15. A voltage divider as in claim 1 wherein said variable voltage divider has first and second terminals comprising the input terminals and a third terminal acting with said second terminal as said output terminals, one end of each of said impedance means being connected to said third terminal, said first switching means and said switch means of said auxiliary switching means for connecting the said other end of each of said plurality of impedance means to said first or second terminals of said variable voltage divider to vary its voltage division ratio, and master switching means for selectively connecting the said other end of all of said divider impedance means to said first or auxiliary switch means so that the divider impedance means can be operated by either of said first or auxiliary switch means.

16. A potentiometer device for accurately measuring a voltage of an unknown value which is adapted for operation from a source of voltage for supplying a selectively variable voltage as one input to a null detector which receives as another input voltage from a standard reference source or from a source of voltage of unknown value comprising:

a variable voltage divider having a plurality of impedance components, output terminals and input terminals for connection to said source of voltage, said voltage divider including first switching means for linearly varying its voltage division ratio by changing the interconnection of the impedance components of said divider between said input and output terminals to produce a correspondingly varying output voltage at said output and a substantially constant output impedance of a known value at said output terminals irrespective of the relationships of the divider impedance components, auxiliary switching means including first and second switch means for each of the divider impedance means for changing the connection of the divider impedance between the divider input and output terminals internal to the divider to change the divider voltage division ratio, master switching means for selectively connecting all of said divider impedance means to said first or second switch means so that the divider impedance means can be operated by either of said first or second switch means, and means connected to the output terminals of said voltage divider in circuit relationship with the constant output impedance of the divider to form another voltage divider to further adjust the output voltage for application to said null detector.

References Cited

UNITED STATES PATENTS

| | | | |
|---|---|---|---|
| 2,784,369 | 3/1957 | Fenemore et al. | |
| 2,803,799 | 8/1957 | Siegel et al. | 324—98 XR |
| 2,884,505 | 4/1959 | Strain et al. | 323—74 XR |
| 2,894,197 | 7/1959 | Berry. | |
| 3,015,790 | 1/1962 | Eisaman et al. | 324—98 XR |
| 3,238,443 | 3/1966 | Julie | 323—74 XR |
| 3,262,049 | 7/1966 | Watson et al. | 323—94 XR |
| 3,270,275 | 8/1966 | Latham | 323—79 |
| 3,308,375 | 3/1967 | Numakura | 323—74 |
| 3,320,526 | 5/1967 | Julie | 324—57 |
| 3,377,555 | 4/1968 | Lewis | 324—63 |

FOREIGN PATENTS

| | | |
|---|---|---|
| 863,591 | 3/1961 | Great Britain. |

GERALD R. STRECKER, Primary Examiner

U.S. Cl. X.R.

323—80; 324—63